US008892346B2

(12) United States Patent
Yamashiro

(10) Patent No.: US 8,892,346 B2
(45) Date of Patent: Nov. 18, 2014

(54) DRIVING ASSISTANCE DEVICE

(71) Applicant: Denso Corporation, Kariya (JP)

(72) Inventor: Takahisa Yamashiro, Chiryu (JP)

(73) Assignee: Denso Corporation, Kariya (JP)

( * ) Notice: Subject to any disclaimer, the term of this patent is extended or adjusted under 35 U.S.C. 154(b) by 8 days.

(21) Appl. No.: 13/795,665

(22) Filed: Mar. 12, 2013

(65) Prior Publication Data

US 2013/0261947 A1 Oct. 3, 2013

(30) Foreign Application Priority Data

Apr. 3, 2012 (JP) ................................ 2012-084998

(51) Int. Cl.
*G05D 1/02* (2006.01)
*G08G 1/137* (2006.01)
*G08G 1/16* (2006.01)

(52) U.S. Cl.
CPC ................ *G08G 1/137* (2013.01); *G08G 1/163* (2013.01)
USPC .......................................... 701/300; 340/903

(58) Field of Classification Search
CPC ............................... G08G 1/137; G08G 1/166
USPC ............................. 701/300, 96; 340/903, 435
See application file for complete search history.

(56) References Cited

FOREIGN PATENT DOCUMENTS

| | | |
|---|---|---|
| JP | 2004-077281 | 3/2004 |
| JP | 2005-043187 | 2/2005 |
| JP | 2006-85285 | 3/2006 |
| JP | 2008-70998 | 3/2008 |
| JP | 2011-034436 | 2/2011 |

OTHER PUBLICATIONS

Office action dated Apr. 1, 2014 in corresponding Japanese Application No. 2012-084998.

*Primary Examiner* — Thomas G Black
*Assistant Examiner* — Luke Huynh
(74) *Attorney, Agent, or Firm* — Harness, Dickey & Pierce, PLC

(57) ABSTRACT

A driving assistance device includes: a surrounding-vehicle-information acquisition device for sequentially acquiring vehicle information for specifying a position and a travelling direction of a surrounding vehicle; a position acquisition device and a direction acquisition device for a host vehicle; a display controller for controlling a display device to display an image indicative of a current position of the surrounding vehicle relative to the current position and the travelling direction of the host vehicle; a surrounding-vehicle-track generation device for generating a surrounding vehicle track, which is at least one of a previous track and a future track of the surrounding vehicle; and a track display determination device for determining whether it is necessary to display the surrounding vehicle track. The display device further displays the surrounding vehicle track when it is necessary to display the surrounding vehicle track.

8 Claims, 5 Drawing Sheets

DRIVING ASSISTANCE DEVICE

CROSS REFERENCE TO RELATED APPLICATION

This application is based on Japanese Patent Application No 2012-84998 filed on Apr. 3, 2012, the disclosure of which is incorporated herein by reference.

TECHNICAL FIELD

The present disclosure relates to a driving assistance device which utilizes vehicle-to-vehicle communication to display a position of a surrounding vehicle around a host vehicle relative thereto and a travelling direction of the surrounding vehicle.

BACKGROUND

Japanese Unexamined Patent Publication No. 2004-77281 discloses a navigation system which displays the positions of a host vehicle and its surrounding vehicle on an electronic map based on information on the position of the surrounding vehicle and the direction thereof which has been obtained from the surrounding vehicle by vehicle-to-vehicle communication and shows the travelling directions of the host vehicle and the surrounding vehicle with the points of arrows.

However, in the technique disclosed in Japanese Unexamined Patent Publication No. 2004-77281, when the navigation system is to be applied to a device which does not or cannot use an electronic map, the problem arises that it is difficult for the user thereof to recognize the relationship between the surrounding vehicle and the host vehicle of which the positions and travelling directions are displayed. The details are as follows.

If the positions of the host vehicle and the surrounding vehicle and the travelling directions thereof are displayed without displaying an electronic map, the user cannot recognize the relationship between the host vehicle and the surrounding vehicle such as the read/follow relationship therebetween or the relationship which will cross the host vehicle and the surrounding vehicle in the future based on the shapes of roads on an electronic map. As a result, the user has difficulty in recognizing the relationship between the host vehicle and the surrounding vehicle.

For example, a surrounding vehicle corresponding to a vehicle preceding a host vehicle on a curved road has the lead-follow relationship with the host vehicle. However, depending on the position thereof on the curved road, the travelling direction of the preceding vehicle may be greatly different from that of the host vehicle. In this case, if there is no display of an electronic map, the user has difficulty in recognizing that the host vehicle is following the foregoing preceding vehicle.

SUMMARY

It is an object of the present disclosure to provide a driving assistance device which allows the user to easily recognize the relationship between a host vehicle and a surrounding vehicle even when the positions of the host vehicle and the surrounding vehicle performing vehicle-to-vehicle communication therebetween are displayed without displaying an electronic map.

According to an example aspect of the present disclosure, a driving assistance device for a vehicle includes: a surrounding-vehicle-information acquisition device for sequentially acquiring vehicle information, which is sequentially transmitted from a surrounding vehicle around a host vehicle by vehicle-to-vehicle communication, the vehicle information including information for specifying a position and a travelling direction of the surrounding vehicle; a position acquisition device for acquiring a current position of the host vehicle; a direction acquisition device for acquiring a travelling direction of the host vehicle; a display controller for controlling a display device to display an image indicative of a current position of the surrounding vehicle relative to the current position and the travelling direction of the host vehicle, according to the vehicle information of the surrounding vehicle, and the current position and the travelling direction of the host vehicle; a surrounding-vehicle-track generation device for generating a surrounding vehicle track, which is at least one of a previous track and a future track of the surrounding vehicle, based on the vehicle information of the surrounding vehicle, the previous track being indicative of a past travelling track, and the future track being indicative of an expected future travelling track; and a track display determination device for determining whether it is necessary to display the surrounding vehicle track of the surrounding vehicle, based on the vehicle information of the surrounding vehicle, and the current position and the travelling direction of the host vehicle. The display controller controls the display device to further display the surrounding vehicle track of the surrounding vehicle in the image when the track display determination device determines that it is necessary to display the surrounding vehicle track of the surrounding vehicle.

In the above driving assistance device, in addition to the current position of the surrounding vehicle relative to the current position of the host vehicle, at least either of the previous track of the surrounding vehicle and the expected track thereof is displayed. Since the user of the host vehicle recognizes the outline of the route of the host vehicle, by comparing the route of the host vehicle to the foregoing track, the user easily recognizes the relationship between the surrounding vehicle for which the foregoing track is displayed and the host vehicle even when an electronic map is not displayed. For example, the user easily recognizes the relationship between the host vehicle and the surrounding vehicle such as the lead-follow relationship therebetween or the relationship which will cross the host vehicle and the surrounding vehicle in the future.

In addition, since the foregoing track is displayed for the surrounding vehicle having the track determined to be displayed by the track display determination device, it is possible to limit the display of the foregoing track to some of the surrounding vehicles performing vehicle-to-vehicle communication with the host vehicle. By thus limiting the surrounding vehicles for which the foregoing tracks are displayed, it is possible to inhibit the display of the foregoing track from becoming intricate and also allow the user to easily recognize the relationships between the host vehicle and the surrounding vehicles.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
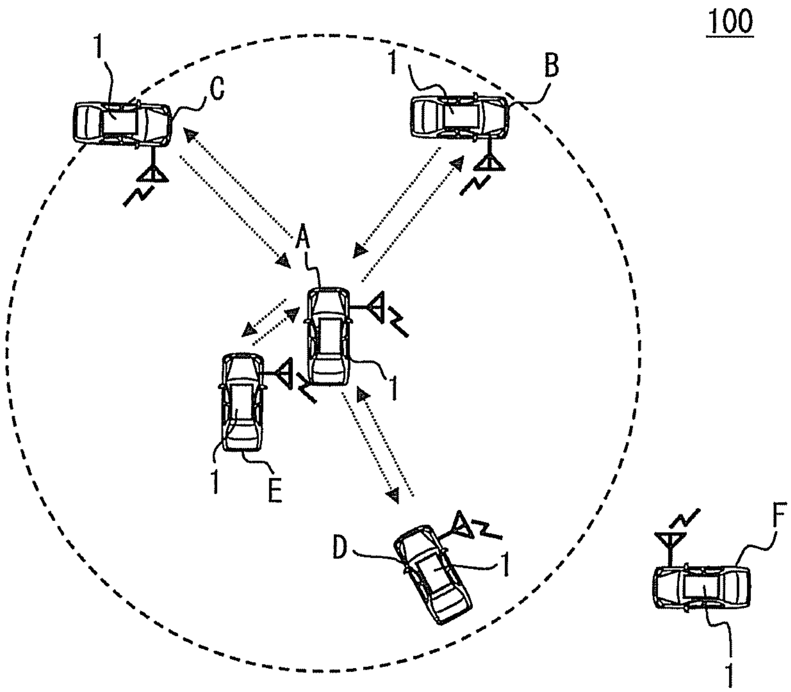
FIG. 1 is a block diagram showing a schematic configuration of a driving assistance system.

An embodiment will be described below using the drawings. FIG. 1 is a block diagram showing a schematic configuration of a driving assistance system 100. The driving assistance system 100 shown in FIG. 1 includes a driving assistant ECU 1 mounted in each of a plurality of vehicles (vehicles A to F) in each of which a wireless communication device 2 is mounted.

Figure 2:
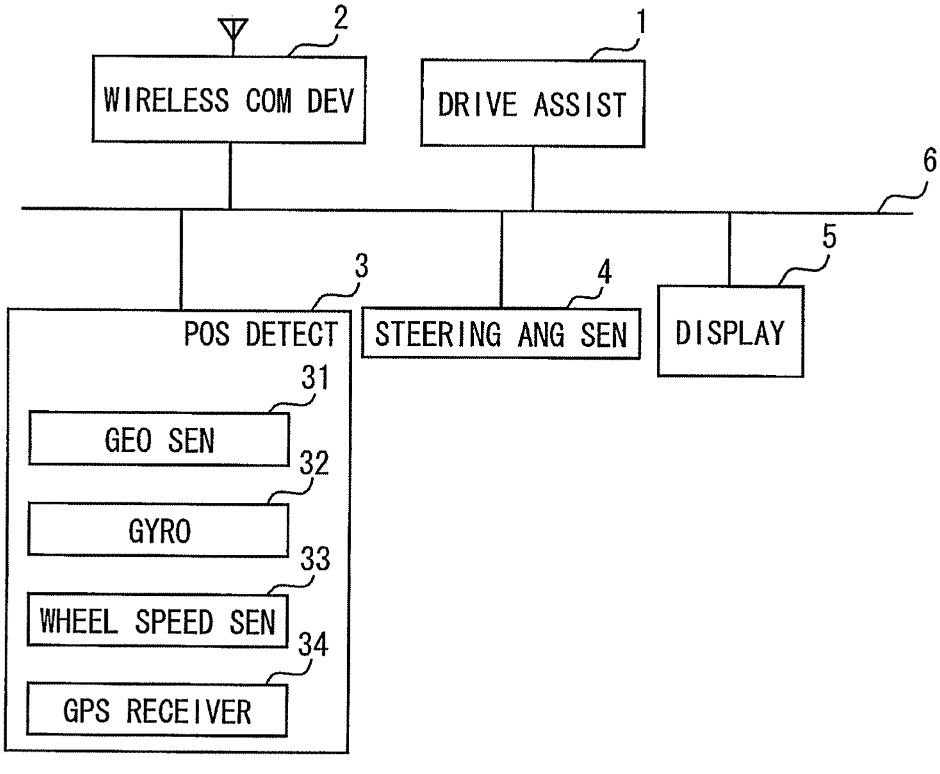
FIG. 2 is a block diagram showing a schematic configuration of a driving assistant ECU.

Here, using FIG. 2, a description will be given of a schematic configuration of the driving assistant ECU 1 mounted in each of the vehicles A to F. As shown in FIG. 2, the driving assistant ECU 1 is connected to the wireless communication device 2, a position detector 3, a steering angle sensor 4, and a display device 5 to be able to exchange signals (information) therewith. In the present embodiment, by way example, the driving assistant ECU 1, the wiring communication device 2, the position detector 3, the steering angle sensor 4, and the display device 5 are assumed to be connected to each other by an in-vehicle LAN 6 compliant with a communication protocol such as CAN (controller area network).

The wireless communication device 2 includes a transmission/reception antenna and performs transmission/reception of information (i.e., vehicle-to-vehicle communication) between itself and surrounding vehicles which are present around the position of a host vehicle by wireless communication without interposition of a telephone network therebetween. For example, in the case of wireless communication using radio waves in the 700 MHz band, the wireless communication device 2 performs vehicle-to-vehicle communication between itself and another vehicle present in the radius range of, e.g., about 1 km around the position of the host vehicle. In the case of wireless communication using radio waves in the 5.9 GHz band, the wireless communication device 2 performs vehicle-to-vehicle communication between itself and another vehicle present in the radius range of, e.g., about 500 m around the position of the host vehicle.

The position detector 3 sequentially detects the current position of the host vehicle based on information obtained from each of sensors such as a geomagnetic sensor 31 for detecting geomagnetism, a gyroscope 32 for detecting an angular speed around the vertical direction of the host vehicle, a wheel speed sensor 33 for detecting the speed of the host vehicle from the rotation speed of each of rotating wheels, and a GPS receiver 34 for a GPS (global positioning system) for detecting the current position of the host vehicle based on radio waves from satellites. Note that the current position of the host vehicle may be represented appropriately by a coordinate (longitude/latitude).

Since these sensors have errors of different natures, they are composed of a plurality of sensors so as to be used while complementing each other. Note that, depending on the accuracy of each of the sensors, the position detector 3 may be composed of some of the sensors mentioned above or may also have a configuration using a sensor other than those mentioned above. In the present embodiment, as the receiver of a satellite position measuring system, the configuration using the GPS receiver 34 for the GPS is shown, but it is not necessarily limited thereto. For example, it may also be possible to use a configuration using the receiver of a satellite position measuring system other than the GPS.

The steering angle sensor 4 detects the steering angle of the steering wheel of the host vehicle. The steering angle sensor 4 uses the steering angle when the host vehicle A drives in a straight-ahead state as a neutral position (0 degree) and outputs a rotation angle from the neutral position as the steering angle. Note that the steering angle is outputted with a positive sign (+) in the case of rightward rotation from the neutral position and is outputted with a negative sign (−) in the case of leftward rotation from the neutral position.

The display device 5 is fixedly or portably mounted in the host vehicle to be used in a vehicle compartment to display a text or an image. The display device 5 is capable of, e.g., full-color display and can be composed using a liquid crystal display, an organic EL display, a plasma display, a head-up display, or the like. For the display device 5, e.g., a configuration may be used in which a dedicated display is mounted or a display such as a so-called display audio (DA) is used.

The driving assistant ECU 1 is composed mainly as a microcomputer of a CPU, a memory such as a ROM, a RAM, or an EEPROM, an I/O each of which is well known, and a bus providing connection therebetween. The driving assistant ECU 1 executes various control programs stored in the ROM based on various types of information input from the wireless communication device 2, the position detector 3, and the steering angle sensor 4 to execute various processes such as a process related to the display of the position of a surrounding vehicle performing vehicle-to-vehicle communication with the host vehicle (hereinafter referred to as surrounding-vehicle-position-display-related process) or the like. The driving assistant ECU 1 corresponds to the driving assistance device.

The driving assistant ECU 1 sequentially acquires vehicle information including information on the position of the host vehicle, information on the travelling direction thereof, information on the amount of operation, and information on the amount of movement and transmits the vehicle information every given cycle period (e.g., every 100 milliseconds).

The information on the position of the host vehicle (hereinafter referred to as positional information) is assumed to include at least the current position of the host vehicle. The current position of the host vehicle may be acquired appropriately from the positional detector 3. The positional information may also include not only the current position of the host vehicle, but also the previous positions thereof. For the previous positions of the host vehicle, by storing the results of previous detection of the current positions performed several times by the position detector 3, the current positions previously detected several times may be acquired appropriately as the previous positions.

The information on the travelling direction of the host vehicle (hereinafter referred to as travelling direction information) is, e.g., the azimuth angle of the host vehicle. The azimuth angle of the host vehicle may be acquired appropriately by performing calculation based on the output of the geomagnetic sensor 31. Therefore, the driving assistant ECU 1 corresponds to the direction acquisition device. As the azimuth angle, an azimuth angle based on, e.g., the north may be used appropriately.

The information on the amount of operation of the host vehicle (hereinafter referred to as operation amount information) is, e.g., the steering angle which is acquired from the steering angle sensor 4. The information on the amount of movement of the host vehicle is, e.g., the vehicle speed or a yaw rate. The vehicle speed may be acquired appropriately from the wheel speed sensor 33. The yaw rate may be acquired appropriately using the gyroscope 32.

By way of example, the operation assistant ECU 1 may be configured such that, when the vehicle information is transmitted from the wireless communication device 2, a time stamp (e.g., GPS time) showing the time when each of the information items included in the vehicle information is detected is added to the information item and then the vehicle information is transmitted. The driving assistant ECU 1 may also be configured such that, when the vehicle information is transmitted from the wireless communication device 2, identification information which allows the transmitter of the vehicle information to be specified, such as the vehicle ID of the host vehicle or the device ID of the wireless communication device 2, is added to the vehicle information and then the vehicle information is transmitted or, alternatively, the vehicle information is transmitted without any added identification information.

The driving assistant ECU 1 acquires the foregoing vehicle information sequentially transmitted from the wireless communication device 2 mounted in each of the surrounding vehicles within the range in which vehicle-to-vehicle communication can be performed via the wireless communication device 2 of the host vehicle. Therefore, the driving assistant ECU 1 corresponds to the surrounding-vehicle-information acquisition device.

When the received vehicle information has the added identification information which allows the transmitter to be specified, the driving assistant ECU 1 specifies each of the plurality of surrounding vehicles capable of performing vehicle-to-vehicle communication based on the identification information.

On the other hand, when the received vehicle information does not have the added identification information which allows the transmitter to be specified, the driving assistant ECU 1 may be configured appropriately to determine the previous drive track (hereinafter referred to as previous track) of each of the surrounding vehicles based on the positional information and the travelling direction information of the surrounding vehicles included in the received vehicle information and specify each of the plurality of surrounding vehicles capable of performing vehicle-to-vehicle communication. For example, the surrounding vehicle corresponding to the sequentially received vehicle information may be specified appropriately based on the previous track of the surrounding vehicle which is overlapped by the previous track determined based on the received vehicle information.

It is assumed that that the current positions of the host vehicle and the surrounding vehicles and the travelling directions thereof at the same time point are associated with each other using the time stamp for the time when the current positions and the travelling directions are detected. It is also assumed that the current position and the travelling direction which are detected in the host vehicle are sequentially stored in the memory of the driving assistant ECU 1 such as a RAM in association with the time stamp for the time when they are detected.

Figure 3:
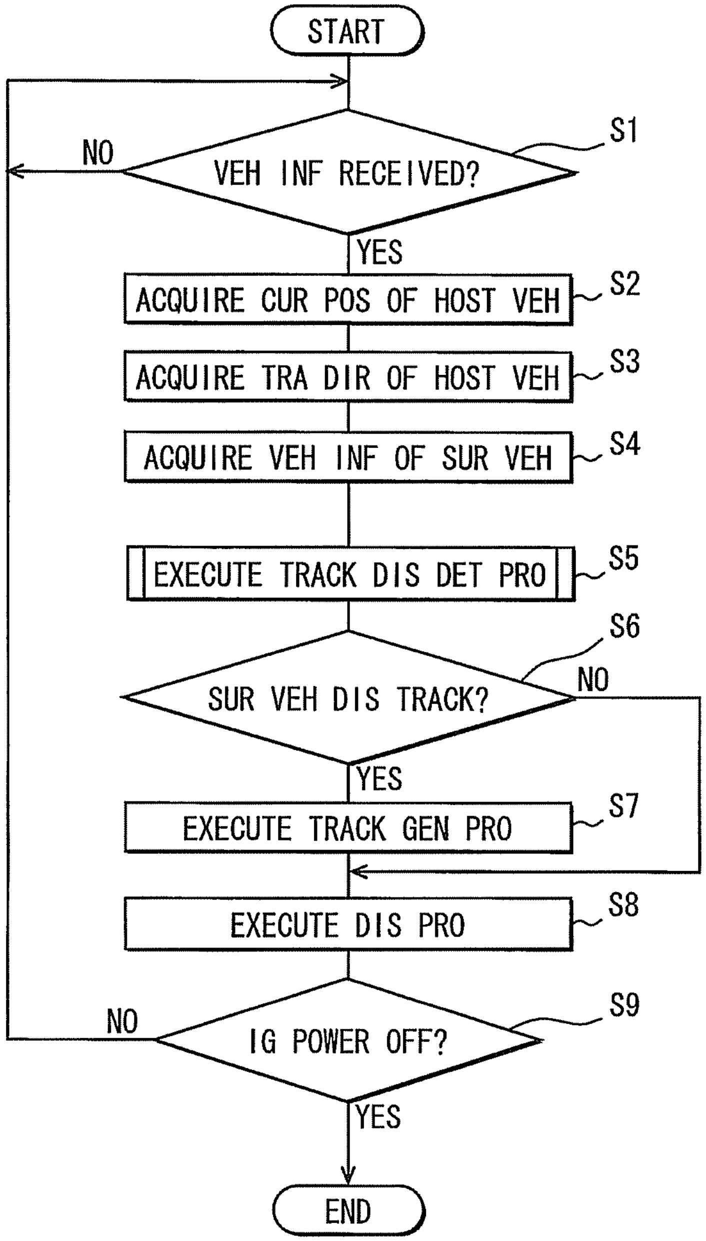
FIG. 3 is a flow chart showing an example of the flow of a surrounding-vehicle-position-display-related process in the driving assistant ECU.

Subsequently, using the flow chart of FIG. 3, a description will be given of the surrounding-vehicle-position-display-related process in the driving assistant ECU 1. The flow of FIG. 3 is assumed to be started when, e.g., the ignition power source of the host vehicle is turned ON.

First, in Step S1, it is determined whether or not the vehicle information has been received from the wireless communication device 2 of any of the surrounding vehicles in a given period. By way of example, a configuration may be used appropriately which determines that the vehicle information has been received in a given period when the vehicle information received by the wireless communication device 2 of the host vehicle has been input in the given period and determines that the vehicle information has not been received in a given period when the vehicle information received by the wireless communication device 2 of the host vehicle has not been input in the given period. The given period mentioned here is a period which can be arbitrarily set and may have, e.g., a value around the transmission cycle period of the vehicle information or a value of about several seconds. In the present embodiment, the given period is assumed to be 100 msec.

When it is determined that the vehicle information has been received in the given period (YES in Step S1), the whole process flow moves to Step S2. When it is not determined that vehicle information has been received in the given period (NO in Step S1), the whole process flow moves to Step S1.

In Step S2, the current position of the host vehicle is acquired, and the whole process flow moves to Step S3. Therefore, the process in Step S2 corresponds to the position acquisition device. As for the current position of the host vehicle, it may be acquired appropriately from the position detector 3, as described above.

In Step S3, the travelling direction of the host vehicle is acquired, and the whole process flow moves to Step S3. Therefore, the process in Step S3 corresponds to the direction acquisition device. In the present embodiment, by way of example, a description will be given of the case where the travelling direction is given by an azimuth angle based on the north. The travelling direction of the host vehicle may be acquired appropriately by calculating the azimuth angle based on the output of the geomagnetic sensor 31, as described above.

Note that the azimuth angle may be calculated from the line segment connecting the current position of the host vehicle and the immediately previous position thereof or, alternatively, the azimuth angle may be calculated from an approximate line obtained from the current position of the host vehicle and the previous positions thereof detected several times by a least squares method.

In Step S4, the vehicle information received from the wireless communication device 2 of the surrounding vehicle in the given period shown in Step S1 is acquired, and the whole process flow moves to Step S5. In Step S4, the vehicle information of each of the surrounding vehicles within the communication range of the wireless communication device 2 of the host vehicle is acquired. Note that the processes in Steps S2 to S4 may be switched in order or may also be performed in parallel.

Figure 4:
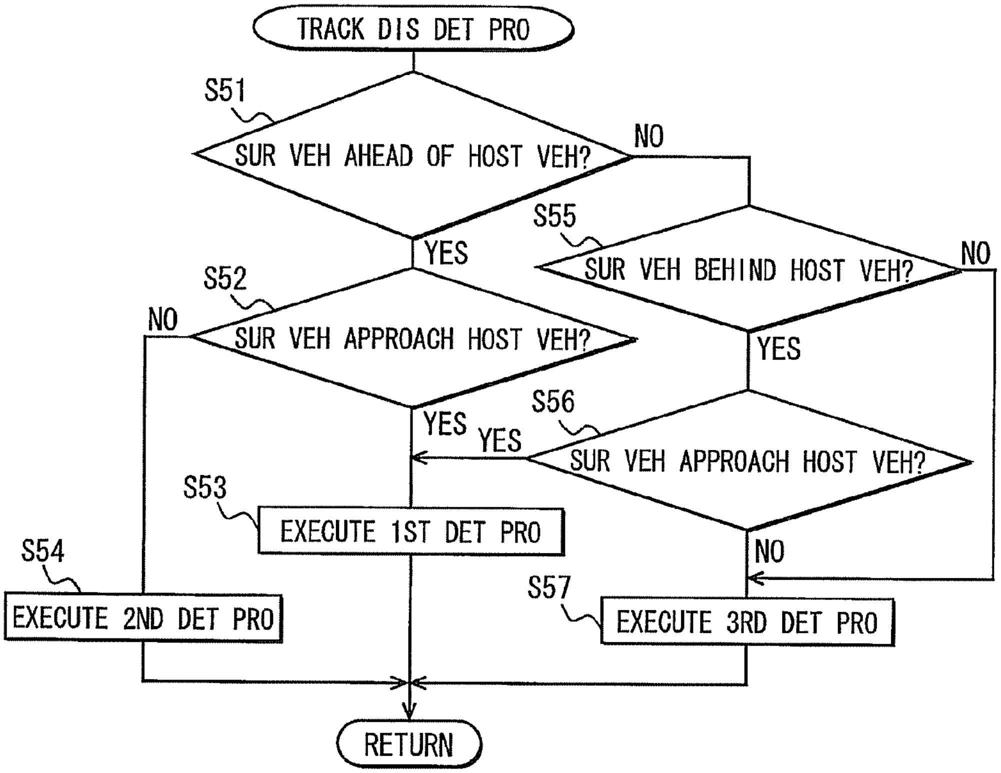
FIG. 4 is a flow chart showing an example of the flow of a track display determination process.

In Step S5, a track display determination process is performed, and the whole process flow moves to Step S6. The process in Step S5 corresponds to the track display determination device. Here, using the flow chart of FIG. 4, a description will be given to the outline of the track display determination process. The track display determination process is assumed to be performed for each of the surrounding vehicles the vehicle information of which has been received.

First, in Step S51, it is determined whether or not the surrounding vehicle is present ahead of the host vehicle. By way of example, whether or not the surrounding vehicle is present ahead of the host vehicle may be determined appropriately as follows.

First, the current position of the surrounding vehicle is replaced with a coordinate in a two-dimensional coordinate system in which, e.g., the coordinate (in which the latitude corresponds to the y-coordinate and the longitude corresponds to the x-coordinate) of the current position of the host vehicle is the original and the direction of the azimuth angle of the host vehicle is the positive direction of the y-axis. Then, it may be determined appropriately that, when the y-coordinate of the current position of the surrounding vehicle is not less than a given positive value, the surrounding vehicle is present ahead of the host vehicle or, when the y-coordinate is less than the given positive value, the surrounding vehicle is not present ahead of the host vehicle. The given positive value mentioned here is a value which can be set arbitrarily, and may be set appropriately to a value around, e.g., a measurement error in current position.

In Step S51, when it is determined that the surrounding vehicle is present ahead of the host vehicle (YES in Step S51), the whole process flow moves to Step S52. On the other hand, when it is determined that the surrounding vehicle is not present ahead of the host vehicle (NO in Step S51), the whole process flow moves to Step S55.

In Step S52, it is determined whether or not the surrounding vehicle is approaching the current position of the host vehicle. By way of example, whether or not the surrounding vehicle is approaching the current position of the host vehicle may be determined appropriately as follows.

The previous position of the targeted surrounding vehicle is also replaced with a coordinate in the two-dimensional coordinate system mentioned above. When the positional information of the vehicle information received from the surrounding vehicle includes the previous position of the surrounding vehicle, the included previous position is used as the previous position of the surrounding vehicle. On the other hand, when the positional information does not include the previous position of the surrounding vehicle, the current position included in the vehicle information of the surrounding vehicle that had been received previously to the reception of the immediately previous vehicle information of the surrounding vehicle may be used appropriately as the previous position of the surrounding vehicle.

Then, it may be determined appropriately that, when the distance between the current position of the host vehicle (which is the original in the present embodiment) and the current position of the surrounding vehicle is shorter than the distance between the current position of the host vehicle and the previous position of the surrounding vehicle, the surrounding vehicle is approaching the current position of the host vehicle or, when the distance between the current position of the host vehicle and the current position of the surrounding vehicle is not shorter than the distance between the current position of the host vehicle and the previous position of the surrounding vehicle, the surrounding vehicle is not approaching the current position of the host vehicle.

In Step S52, when it is determined that the surrounding vehicle is approaching the current position of the host vehicle (YES in Step S52), the whole process flow moves to Step S53 or, when it is determined that the surrounding vehicle is not approaching the current position of the host vehicle (NO in Step S52), the whole process flow moves to Step S54.

In Step S53, a first determination process is performed, and the whole process flow moves to Step S6. In the first determination process, it is determined to display an expected future drive track (hereinafter referred to as expected track) for the surrounding vehicle determined to be approaching the current position of the host vehicle in Step S52.

In Step S52, when it is determined that the surrounding vehicle is not approaching the current position of the host vehicle, a second determination process is performed in Step S54, and the whole process flow moves to Step S6. In the second determination process, it is determined to display the previous track for the surrounding vehicle determined to be not approaching the current position of the host vehicle in Step S52.

When it is determined in Step S51 that the surrounding vehicle is not present ahead of the host vehicle, it is determined in Step S55 whether or not the surrounding vehicle is present behind the host vehicle. By way of example, whether or not the surrounding vehicle is present behind the host vehicle may be determined appropriately as follows.

First, the current position of the surrounding vehicle is replaced with a coordinate in the two-dimensional coordinate system described above. Then, it may be determined appropriately that, when the y-coordinate of the current position of the surrounding vehicle is not more than a given negative value, the surrounding vehicle is present behind the host vehicle or, when the y-coordinate is more than the given negative value, the surrounding vehicle is not present behind the host vehicle. The predetermined negative value mentioned here is a value which can be set arbitrarily, and may be set appropriately to a value around, e.g., a measurement error in current position.

In Step S55, when it is determined that the surrounding vehicle is present behind the host vehicle (YES in Step S55), the whole process flow moves to Step S56. On the other hand, when it is determined that the surrounding vehicle is not present behind the host vehicle (NO in Step S55), the whole process flow moves to Step S57 on the assumption that the surrounding vehicle is driving parallel to the host vehicle.

In Step S56, it is determined whether or not the surrounding vehicle is approaching the current position of the host vehicle. As for whether or not the surrounding vehicle is approaching the current position of the host vehicle, it may be determined appropriately in the same manner as in Step S52 described above. When it is determined that the surrounding vehicle is approaching the current position of the host vehicle (YES in Step S56), the whole process flow moves to Step S53. When it is determined that the surrounding vehicle is not approaching the current position of the host vehicle (NO in Step S56), the whole process flow moves to Step S57.

In Step S57, a third determination process is performed, and then the whole process flow moves to Step S6. In the third determination process, it is determined to display, for the surrounding vehicle determined to be not approaching the current position of the host vehicle in Step S56 or the surrounding vehicle determined to be not present behind the host vehicle (determined to be driving parallel to the host vehicle) in Step S55, neither the expected track nor the previous track.

Note that the processes in Step S51, S52, S55, and S56 correspond to the positional change determination device.

Referring back to FIG. 3, in Step S6, when there is a surrounding vehicle for which it is determined to display the previous track or the expected track in the track display determination process (YES in Step S6), the whole process flow moves to Step S7. On the other hand, when there is no surrounding vehicle for which it is determined to display the track in the track display determination process (NO in Step S6), the whole process flow moves to Step S8.

In Step S7, a track generation process is performed, and then the whole process flow moves to Step S8. In the track generation process, for the surrounding vehicle for which it is determined to display the track in the track display determination process, the track of the type determined to be displayed in the track display determination process is generated. Therefore, Step S7 corresponds to the surrounding-vehicle-track generation device.

Specifically, for the surrounding vehicle for which it is determined to display the expected track in the first determination process described above, the expected track is generated and, for the surrounding vehicle for which it is determined to display the previous track in the second determination process described above, the previous track is generated. By way of example, the expected track may be generated appropriately based on the turning radius of the surrounding vehicle estimated from the received vehicle information.

The turning radius may be estimated from the vehicle speed of the surrounding vehicle and the steering angle thereof each included in the vehicle information by a known method or may also be estimated from the vehicle speed and the yaw rate each included in the vehicle information by a known method. It may also be possible to calculate the radius of curvature of the approximate curve of the track obtained by connecting the current position of the surrounding vehicle and the several previous positions thereof and estimate the calculated radius of curvature as the turning radius.

Otherwise, since the correspondence relationship between the steering angle and the turning radius obtained by actual measurement or data interpolation is stored in advance in the memory of the driving assistant ECU 1 such as a ROM, the turning radius may also be estimated from the steering angle of the surrounding vehicle based on the correspondence relationship. The expected track may be generated appropriately as an arc along the turning radius.

On the other hand, the previous track may be generated appropriately by connecting the current position of the surrounding vehicle and the previous positions thereof. As the previous positions, e.g., more than ten spots may be used appropriately. Note that when the received vehicle information includes not only the current position but also the previous positions and is transmitted after the number of spots as the previous positions on a straight road is omitted, the previous positions may also be one to several spots. When the current position of the surrounding vehicle and the previous positions thereof are connected to generate the previous track, linear interpolation may also be utilized.

In Step S8, a display process is performed, and then the whole process flow moves to Step S9. In the display process, an image showing the travelling direction of the host vehicle and the current position of the surrounding vehicle relative to the current position of the host vehicle is displayed on the display device 5 while, for the surrounding vehicle for which it is determined to display the track in the track display determination process, the track generated in the track generation process is also displayed in the image. Therefore, Step S8 corresponds to the display controller. It is assumed that the current positions of the host vehicle and the surrounding vehicle and the track of the surrounding vehicle are not displayed on an electronic map.

As an example, a mark showing the current position of the host vehicle is displayed at the center of the screen of the display device 5. The travelling direction of the host vehicle may be shown appropriately by adding an arrow to the mark showing the current position of the host vehicle or by the orientation of the mark showing the current position of the host vehicle. Otherwise, the travelling direction of the host vehicle may also be shown by constantly showing the forward direction of the host vehicle as the upward direction on the screen.

In the present embodiment, it is assumed that, as the mark showing the current position of the host vehicle, e.g., a vehicle-shaped mark is used. It is also assumed that the travelling direction of the host vehicle is shown by each of the orientation of the vehicle-shaped mark and by constantly showing the forward direction of the host vehicle as the upward direction on the screen. The current position of the host vehicle may also be displayed in a region other than the center such as at a position vertically deviated from the center of the screen.

The current position of the surrounding vehicle is shown by displaying the mark at a position on the screen in accordance with the relative position of the host vehicle in the two-dimensional coordinate system described above. For the surrounding vehicle for which it is determined to display the track in the track display determination process, the expected track and the previous track each generated in the track generation process are also displayed.

The travelling direction of the surrounding vehicle may be displayed only for the surrounding vehicle having the track to be displayed on the screen or for each of the surrounding vehicles having the tracks to be displayed on the screen. The travelling direction of the surrounding vehicle may be shown appropriately by adding an arrow to the mark showing the current position of the surrounding vehicle or by the orientation of the mark showing the current position of the surrounding vehicle. When the travelling direction is to be displayed only for the surrounding vehicle having the track to be displayed on the screen, an arrow may also be added to the track.

In the present embodiment, it is assumed that, as the mark showing the current position of the surrounding vehicle, e.g., an isoceles triangular mark is used. It is also assumed that the travelling direction of the surrounding vehicle is shown by the orientation of the apex angle of the isoceles triangular mark. The expected track and the previous track of the surrounding vehicle may also be shown by different types of lines to be distinguishable from each other.

Here, using FIGS. 5 to 8, specific examples of the display on the display device 5 are shown. In FIGS. 5 to 8, A denotes the mark showing the current position of the host vehicle, B to E denote the marks showing the current positions of the surrounding vehicles, G shows the expected track, and H shows the previous track.

Figure 5:
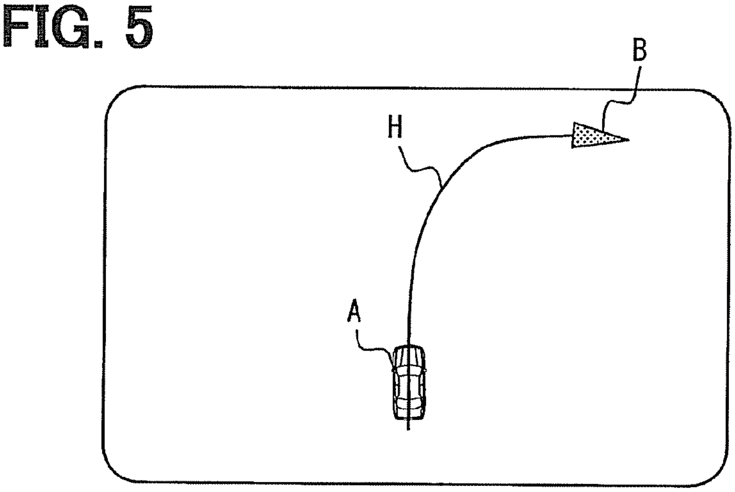
FIG. 5 is a diagram showing an example of display on a display unit.

FIG. 5 is a view showing the example of the display when it is determined in the track display determination process that the surrounding vehicle is ahead of the host vehicle and is not approaching the current position of the host vehicle. In such a case, as shown in FIG. 5, the mark B showing the current position of the surrounding vehicle is displayed with the previous track H of the surrounding vehicle added thereto. This allows the user such as the driver or passenger of the host vehicle to recognize the relationship between the host vehicle and the surrounding vehicle, e.g., whether the surrounding vehicle is a vehicle driving ahead of the host vehicle in the route ahead of the host vehicle (i.e., driving followed by the host vehicle) or a vehicle which will merely cross the route ahead of the host vehicle and drive away.

Figure 6:
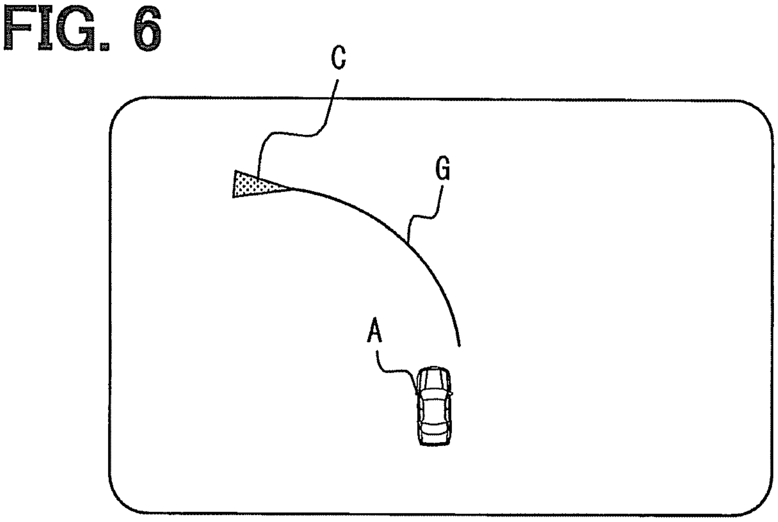
FIG. 6 is a diagram showing an example of the display on the display unit.

FIG. 6 is a view showing the example of the display when it is determined in the track display determination process that the surrounding vehicle is ahead of the host vehicle and is approaching the current position of the host vehicle. In such a case, as shown in FIG. 6, the mark C showing the current position of the surrounding vehicle is displayed with the expected track G of the surrounding vehicle added thereto. This allows the user of the host vehicle to recognize the relationship between the host vehicle and the surrounding vehicle, e.g., whether the surrounding vehicle is a surrounding vehicle which will cross the host vehicle in the route ahead of the host vehicle or a surrounding vehicle which will merely pass the host vehicle without crossing it in the route ahead of the host vehicle.

Figure 7:
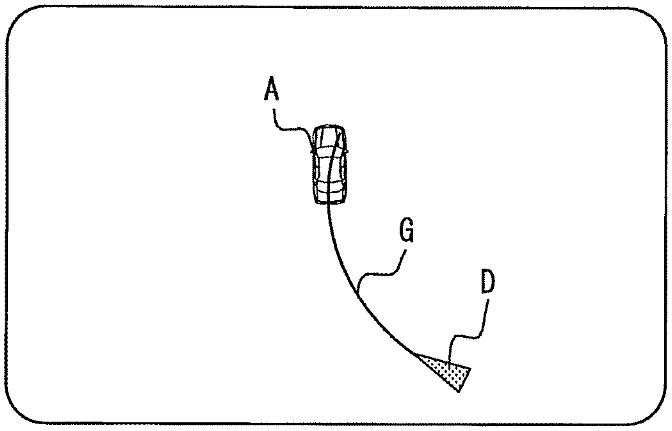
FIG. 7 is a diagram showing an example of the display on the display unit.

FIG. 7 is a view showing the example of the display when it is determined in the track display determination process that the surrounding vehicle is behind the host vehicle and is approaching the current position of the host vehicle. In such a case, as shown in FIG. 7, the mark D showing the current position of the surrounding vehicle is displayed with the expected track G of the surrounding vehicle added thereto. This allows the user of the host vehicle to recognize the relationship between the host vehicle and the surrounding vehicle, e.g., whether the surrounding vehicle is a surrounding vehicle following the host vehicle from therebehind or a surrounding vehicle which will merely cross the route passed by the host vehicle.

Figure 8:
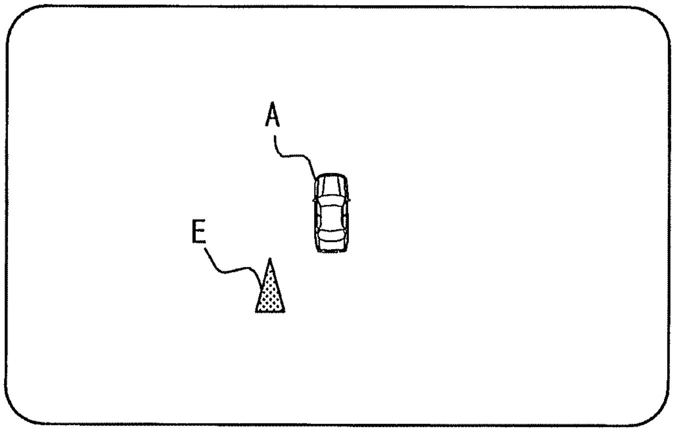
FIG. 8 is a diagram showing an example of the display on the display unit.

FIG. 8 is a view showing the example of the display when it is determined in the track display determination process that the surrounding vehicle is driving parallel to the host vehicle. In such a case, as shown in FIG. 8, the mark E showing the current position of the surrounding vehicle is displayed without the expected track G or the previous track H added thereto. This can inhibit the display from becoming intricate by limiting the surrounding vehicles for which the tracks are to be displayed.

Note that the display range to be displayed on the display device 5 may be a range including the current positions of all the surrounding vehicles capable of vehicle-to-vehicle communication therebetween or may be a range including some of the surrounding vehicles capable of vehicle-to-vehicle communication therebetween. It may also be possible that the display range can be switched using an operation switch not shown. When the display range is to be switched, for the surrounding vehicle of which the mark showing the current position is outside the screen, the track may not be displayed appropriately.

In Step S9, when the ignition power source of the host vehicle is turned OFF (YES in Step S9), the whole process flow is ended. When the ignition power source of the host vehicle is not turned OFF (NO in Step S9), the whole process flow returns to Step S1 to be repeated.

In the configuration of the present embodiment, not only the current position of the surrounding vehicle relative to the current position of the host vehicle, but also the expected track and the previous track of the surrounding vehicle are displayed. As a result, even when an electronic map is not displayed, the relationship between the surrounding vehicle and the host vehicle is easily recognized. This is because, since the user of the host vehicle recognizes the outline of the route of the host vehicle, by comparing the route of the host vehicle to the expected track or the previous track of the surrounding vehicle displayed on the display device 5, the user can recognize the relationship between the surrounding vehicle for which the track is displayed and the host vehicle even when an electronic map is not displayed.

Also, in the configuration of the present embodiment, the expected track and the previous track are displayed for the surrounding vehicle having the track determined to be displayed in the track display determination process. Therefore, it is possible to limit the display of the expected tracks and the previous tracks to only some of the surrounding vehicles performing vehicle-to-vehicle communication with the host vehicle.

Figure 9:
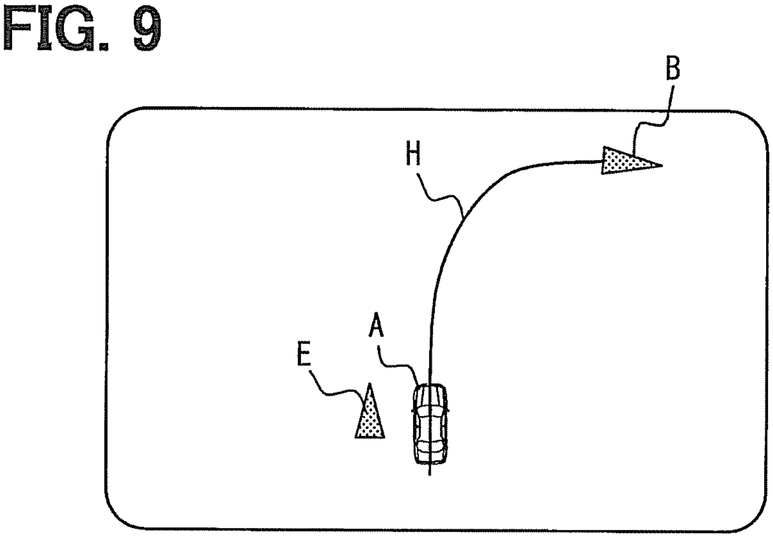
FIG. 9 is a schematic diagram for illustrating the effect of the present system.

For example, as shown in FIG. 9, the mark B showing the surrounding vehicle determined to be ahead of the host vehicle and not approaching the current position of the host vehicle is displayed with the previous track H added thereto, while the mark E showing the surrounding vehicle determined to be driving parallel to the host vehicle is displayed without the expected track G or the previous track H added thereto. Therefore, it is possible to inhibit the display of the tracks of the surrounding vehicles on the display device 5 from becoming intricate and allow the user to easily recognize the relationship between the host vehicle and the surrounding vehicle.

In the embodiment described above, the configuration is shown in which, for each of the surrounding vehicles having the tracks determined to be displayed in the track display determination process, the expected track or the previous track is displayed as long as the surrounding vehicle shows its current position within the display range to be displayed on the display device 5. However, the present disclosure is not necessarily limited thereto. For example, a configuration may also be used in which, e.g., the surrounding vehicles for which the expected tracks or the previous tracks are to be displayed are limited.

For example, in the driving assistant ECU. 1, the point of intersection of the expected track or the previous track of the host vehicle and the track of the surrounding vehicle generated in the track generation process in the two-dimensional coordinate system described above is determined. Then, in the driving assistant ECU 1, the surrounding vehicle from which the point of intersection is obtained (i.e., which crosses the expected track or the previous track of the host vehicle) is selected, and only the track of the selected surrounding vehicle may be displayed appropriately on the display device 5. Therefore, the driving assistant ECU 1 corresponds to the target selecting device.

The expected track and the previous track of the host vehicle may be determined appropriately in the same manner as in the case of the surrounding vehicle using the current position of the host vehicle sequentially acquired from the position detector 3, the vehicle speed acquired from the wheel speed sensor 33 of the host vehicle, the steering angle acquired from the steering angle sensor 4 of the host vehicle, the yaw rate acquired using the gyroscope 32 of the host vehicle, and the like. Therefore, the driving assistant ECU 1 corresponds to the host-vehicle-track determination device.

In the example of the present embodiment, it may be possible that the expected track of the host vehicle crosses the expected track or the previous track of the surrounding vehicle and the previous track of the host vehicle crosses the expected track of the surrounding vehicle. It can be said that the surrounding vehicle having the tracks which may cross the track of the host vehicle has the possibility of colliding with the host vehicle in the future. For example, when the expected track of the host vehicle crosses the expected track of the surrounding vehicle, collision may occur upon crossing. When the expected track of the host vehicle crosses the previous track of the surrounding vehicle, collision may occur due to sudden braking by the preceding surrounding vehicle. When the previous track of the host vehicle crosses the expected track of the surrounding vehicle, collision may occur due to sudden braking by the host vehicle.

In the foregoing configuration, the tracks of the surrounding vehicles having the possibility of colliding with the host vehicle in the future are exclusively displayed on the display device 5 to preferentially allow the user to easily recognize the relationship with the surrounding vehicle which may affect the safety of the host vehicle.

It may also be possible to use a configuration (hereinafter referred to as Modification 1) which selects the surrounding vehicle having the track from which the point of intersection closest to the current position of the host vehicle among the points of intersection of the expected track and the previous track of the host vehicle and the tracks of the surrounding vehicles generated in the track generation process is obtained and displays only the track of the selected surrounding vehicle on the display device 5.

Otherwise, it may also be possible to use a configuration (hereinafter referred to as Modification 2) which selects only a specified number of or fewer surrounding vehicles each having the track from which the point of intersection closer to the current position of the host vehicle among the points of intersection of the expected track and the previous track of the host vehicle and the tracks of the surrounding vehicles generated in the track generation process is obtained and displays only the tracks of the selected surrounding vehicles on the display device 5. The specified number mentioned here is a value which can be arbitrarily set to, e.g., 2 to 3.

It can be said that, of the surrounding vehicles having the tracks which cross the tracks of the host vehicle in the manner described above, the surrounding vehicle having the track from which a point of intersection closer to the current position of the host vehicle is obtained has a higher possibility of collision with the host vehicle in the future. In the configurations of Modifications 1 and 2, the tracks of the surrounding vehicles having the tracks from which the points of intersection closer to the current position of the host vehicle are obtained and the track of the surrounding vehicle having the track from which the point of intersection closest to the current position of the host vehicle is obtained are exclusively displayed on the display device 5. This preferentially allows the user to recognize the relationship with the surrounding vehicles which may affect the safety of the host vehicle in near future.

Otherwise, it may also be possible to use a configuration (hereinafter referred to as Modification 3) which selects the surrounding vehicle having the track most proximate to the expected track and the previous track of the host vehicle among the tracks of the surrounding vehicles generated in the track generation process, and displays only the track of the selected surrounding vehicle on the display device 5. To obtain the track closest to the expected track and the previous track of the host vehicle, e.g., the shortest distances between the expected track and the previous track of the host vehicle and the tracks of the surrounding vehicles are calculated, and the surrounding vehicle having the minimum shortest distance may be selected appropriately. The shortest distance between the tracks may be calculated appropriately by a known method using, e.g., a minimum bounding rectangle (MBR) or the like.

The determination in the track display determination process is not limited to the method described above. For example, the determination may also be made as follows. First, when the expected track of the host vehicle crosses the expected track of the surrounding vehicle, it is assumed that the surrounding vehicle is ahead of the host vehicle and is approaching the current position of the host vehicle, and the first determination process is performed. When the expected track of the host vehicle crosses the previous track of the surrounding vehicle, it is assumed that the surrounding vehicle is ahead of the host vehicle and is not approaching the current position of the host vehicle, and the second determination process is performed. When the previous track of the host vehicle crosses the expected track of the surrounding vehicle, it is assumed that the surrounding vehicle is behind the host vehicle and is approaching the current position of the host vehicle, and the first determination process is performed. When the relationship between the tracks does not correspond to any of these cases, a third determination process may be performed appropriately.

Note that, in the embodiments described above, the configuration is shown in which, when the tracks of the surrounding vehicles are displayed, only either one of the expected track and the previous track is displayed for each of the surrounding vehicles. However, the present disclosure is not limited thereto. For example, a configuration may also be used which causes both of the expected track and the previous track to be displayed.

In the embodiments described above, a configuration in which the expected track and the previous track of the host vehicle are displayed on the display device 5 is not shown. However, the present disclosure is not limited thereto. For example, a configuration may also be used in which the expected track and the previous track of the host vehicle are also displayed on the display device 5.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A driving assistance device for a vehicle comprising:

a surrounding-vehicle-information acquisition device for sequentially acquiring vehicle information, which is sequentially transmitted from a surrounding vehicle around a host vehicle by vehicle-to-vehicle communication, the vehicle information including information for specifying a position and a travelling direction of the surrounding vehicle;

a position acquisition device for acquiring a current position of the host vehicle;

a direction acquisition device for acquiring a travelling direction of the host vehicle;

a display controller for controlling a display device to display an image indicative of a current position of the surrounding vehicle relative to the current position and the travelling direction of the host vehicle, according to the vehicle information of the surrounding vehicle, and the current position and the travelling direction of the host vehicle;

a surrounding-vehicle-track generation device for generating a surrounding vehicle track, which is at least one of a previous track and a future track of the surrounding vehicle, based on the vehicle information of the surrounding vehicle, the previous track being indicative of a past travelling track, and the future track being indicative of an expected future travelling track; and a track display determination device for determining whether it is necessary to display the surrounding vehicle track of the surrounding vehicle, based on the vehicle information of the surrounding vehicle, and the current position and the travelling direction of the host vehicle, and a positional change determination device for determining a change in a positional relationship between the surrounding vehicle and the host vehicle, based on the vehicle information of the surrounding vehicle, and the current position and the travelling direction of the host vehicle, wherein:

the display controller controls the display device to further display the surrounding vehicle track of the surrounding vehicle in the image when the track display determination device determines that it is necessary to display the surrounding vehicle track of the surrounding vehicle;

the track display determination device determines whether it is necessary to display the surrounding vehicle track of the surrounding vehicle, in accordance with the change in the positional relationship;

the track display determination device determines that it is necessary to display the surrounding vehicle track when the change in the positional relationship indicates that the surrounding vehicle does not approach the current position of the host vehicle from a front side of the host vehicle; and the display controller the display device to display the previous track of the surrounding vehicle when the surrounding vehicle does not approach the current position of the host vehicle from the front side of the host vehicle.

2. The driving assistance device according to claim 1, wherein:

the track display determination device determines that it is necessary to display the surrounding vehicle track when the change in the positional relationship indicates that the surrounding vehicle approaches the current position of the host vehicle from a front side of the host vehicle; and the display controller controls the display device to display the future track of the surrounding vehicle when the surrounding vehicle approaches the current position of the host vehicle from the front side of the host vehicle.

3. The driving assistance device according to claim 1, wherein:

the track display determination device determines that it is necessary to display the surrounding vehicle track when the change in the positional relationship indicates that the surrounding vehicle approaches the current position of the host vehicle from a rear side of the host vehicle; and the display controller controls the display device to display the future track of the surrounding vehicle when the surrounding vehicle approaches the current position of the host vehicle from the rear side of the host vehicle.

4. A driving assistance device for a vehicle comprising:

a surrounding-vehicle-information acquisition device for sequentially acquiring vehicle information, which is sequentially transmitted from a surrounding vehicle around a host vehicle by vehicle-to-vehicle communication, the vehicle information including information for specifying a position and a travelling direction of the surrounding vehicle;

a position acquisition device for acquiring a current position of the host vehicle;

a direction acquisition device for acquiring a travelling direction of the host vehicle;

a display controller for controlling a display device to display an image indicative of a current position of the surrounding vehicle relative to the current position and the travelling direction of the host vehicle, according to the vehicle information of the surrounding vehicle, and the current position and the travelling direction of the host vehicle;

a surrounding-vehicle-track generation device for generating a surrounding vehicle track, which is at least one of a previous track and a future track of the surrounding vehicle, based on the vehicle information of the surrounding vehicle, the previous track being indicative of a past travelling track, and the future track being indicative of an expected future travelling track;

a track display determination device for determining whether it is necessary to display the surrounding vehicle track of the surrounding vehicle, based on the vehicle information of the surrounding vehicle, and the current position and the travelling direction of the host vehicle, a host-vehicle-track determination device for determining a host vehicle track, which is at least one of a previous track and a future track of the host vehicle, the previous track being indicative of a past travelling track, and the future track being indicative of an expected future travelling track; and a target selecting device for selecting one of a plurality of peripheral vehicles based on the host vehicle track and the surrounding vehicle track when the surrounding vehicle includes the plurality of peripheral vehicles, and the track display determination device determines that it is necessary to display the surrounding vehicle track of each peripheral vehicle, the one of the plurality of peripheral vehicles having the surrounding vehicle track, which crosses the host vehicle track, wherein:

the display controller controls the display device to further display the surrounding vehicle track of the surrounding vehicle in the image when the track display determination device determines that it is necessary to display the surrounding vehicle track of the surrounding vehicle; and the display controller controls the display device to further display only the surrounding vehicle track of the one of the plurality of peripheral vehicles in the image when the track display determination device determines that it is necessary to display the surrounding vehicle track of each peripheral vehicle.

5. The driving assistance device according to claim 4, wherein:

the target selecting device selects the one of the plurality of peripheral vehicles, which has the surrounding vehicle track crossing the host vehicle track at a position closest to the host vehicle.

6. The driving assistance device according to claim 4, wherein:

the target selecting device selects a predetermined number of the plurality of peripheral vehicles, each of which has the surrounding vehicle track crossing the host vehicle track at a position closer to the host vehicle.

7. A driving assistance device for a vehicle comprising:

a surrounding-vehicle-information acquisition device for sequentially acquiring vehicle information, which is sequentially transmitted from a surrounding vehicle around a host vehicle by vehicle-to-vehicle communication, the vehicle information including information for specifying a position and a travelling direction of the surrounding vehicle;

a position acquisition device for acquiring a current position of the host vehicle;

a direction acquisition device for acquiring a travelling direction of the host vehicle;

a display controller for controlling a display device to display an image indicative of a current position of the surrounding vehicle relative to the current position and the travelling direction of the host vehicle, according to the vehicle information of the surrounding vehicle, and the current position and the travelling direction of the host vehicle;

a surrounding-vehicle-track generation device for generating a surrounding vehicle track, which is at least one of a previous track and a future track of the surrounding vehicle, based on the vehicle information of the surrounding vehicle, the previous track being indicative of a past travelling track, and the future track being indicative of an expected future travelling track;

a track display determination device for determining whether it is necessary to display the surrounding vehicle track of the surrounding vehicle, based on the vehicle information of the surrounding vehicle, and the current position and the travelling direction of the host vehicle, a host-vehicle-track determination device for determining a host vehicle track, which is at least one of a previous track and a future track of the host vehicle, the previous track being indicative of a past travelling track, and the future track being indicative of an expected future travelling track; and a target selecting device for selecting one of a plurality of peripheral vehicles based on the host vehicle track and the surrounding vehicle track when the surrounding vehicle includes the plurality of peripheral vehicles, and the track display determination device determines that it is necessary to display the surrounding vehicle track of each peripheral vehicle, the one of the plurality of peripheral vehicles having the surrounding vehicle track, which is closest to the host vehicle track, wherein:

the display controller controls the display device to further display the surrounding vehicle track of the surrounding vehicle in the image when the track display determination device determines that it is necessary to display the surrounding vehicle track of the surrounding vehicle; and the display controller controls the display device to further display only the surrounding vehicle track of the one of the plurality of peripheral vehicles in the image when the track display determination device determines that it is necessary to display the surrounding vehicle track of each peripheral vehicle.

8. A driving assistance device for a vehicle comprising:

a surrounding-vehicle-information acquisition device for sequentially acquiring vehicle information, which is sequentially transmitted from a surrounding vehicle around a host vehicle by vehicle-to-vehicle communication, the vehicle information including information for specifying a position and a travelling direction of the surrounding vehicle;

a position acquisition device for acquiring a current position of the host vehicle;

a direction acquisition device for acquiring a travelling direction of the host vehicle;

a display controller for controlling a display device to display an image indicative of a current position of the surrounding vehicle relative to the current position and the travelling direction of the host vehicle, according to the vehicle information of the surrounding vehicle, and the current position and the travelling direction of the host vehicle;

a surrounding-vehicle-track generation device for generating a surrounding vehicle track, which is at least one of a previous track and a future track of the surrounding vehicle, based on the vehicle information of the surrounding vehicle, the previous track being indicative of a past travelling track, and the future track being indicative of an expected future travelling track; and a track display determination device for determining whether it is necessary to display the surrounding vehicle track of the surrounding vehicle, based on the vehicle information of the surrounding vehicle, and the current position and the travelling direction of the host vehicle, wherein:

the display controller controls the display device to further display the surrounding vehicle track of the surrounding vehicle in the image when the track display determination device determines that it is necessary to display the surrounding vehicle track of the surrounding vehicle; and the display controller controls the display device to display a mark indicative of the position of the surrounding vehicle in the image without displaying the surrounding vehicle track of the surrounding vehicle when the track display determination device determines that it is not necessary to display the surrounding vehicle track of the surrounding vehicle.

* * * * *